UNITED STATES PATENT OFFICE.

HEINRICH THRON, OF FRANKFORT-ON-THE-MAIN, GERMANY, ASSIGNOR TO THE FIRM OF VEREINIGTE CHININFABRIKEN, ZIMMER & CO. G. M. B. H., OF FRANKFORT-ON-THE-MAIN, GERMANY.

QUININ ESTERS OF AROMATIC AMINO ACIDS AND PROCESS OF PRODUCING SAME.

1,019,285.

Specification of Letters Patent. Patented Mar. 5, 1912.

No Drawing. Application filed July 3, 1911. Serial No. 636,728.

*To all whom it may concern:*

Be it known that I, HEINRICH THRON, a subject of the German Emperor, and resident of Frankfort-on-the-Main, Germany, have invented certain new and useful Improvements in Quinin Esters of Aromatic Amino Acids and Processes of Producing Same, of which the following is a specification.

I have succeeded in preparing the hitherto unknown quinin esters of aromatic amino acids which possess very valuable properties. According to this invention one proceeds most advantageously in such a manner that the quinin ester of the corresponding nitro-acid is first prepared (which may be done in any usual, or suitable, way) and then the nitro-acidyl-quinin ester is reduced and so converted into the desired amino-acidyl-ester.

The following examples illustrate the manners in which this invention can be performed, but the invention is not limited to these examples. The parts are by weight.

*Example I.—Preparation of para-amino-benzoyl-quinin.*—Prepare, by the action of para-nitro-benzoyl chlorid on quinin, or in any other usual, or suitable, manner, the para-nitro-benzoyl-quinin which forms light yellow and tasteless needles, melts at 154° centigrade, and is very difficultly soluble in ether and cold alcohol, but readily soluble in hot alcohol and benzene. 1 part of this para-nitro-benzoyl quinin is dissolved in 7 parts of 10 per cent. hydrochloric acid, mixed with 6 parts of diluted alcohol and, after the addition of 4 parts of a 60 per cent. solution of stannous chlorid in 25 per cent. hydrochloric acid, the mass is heated for a short time at boiling point. After cooling, the mass is supersaturated with dilute soda lye and shaken with ether. The ethereal solution, after being deprived of alcohol as far as possible by means of water and concentrated, is allowed to stand and the para-amino-benzoyl quinin crystallizes in small crystals which are colorless and tasteless and melt at 170° centigrade. It dissolves readily in alcohol, chloroform and hot benzene, while in ether and petroleum-benzin it is difficultly soluble and gives a yellow-brown herapathite.

The acid hydrochlorid of the para-amino-benzoyl-quinin which has the composition

is readily soluble in water, it is almost tasteless and has therefore a great advantage over the extraordinarily bitter tasting, soluble, neutral and acid salts of quinin, and also over the likewise bitter soluble salts of the known quinin esters.

*Example II.—Manufacture of the ortho-amino-benzoyl-quinin.*—324 parts of quinin (one molecular proportion) are dissolved in 5,000 parts of benzene, mixed with 185.5 parts of ortho-nitro-benzoyl-chlorid (one molecular proportion) and heated for a few minutes at boiling point. After cooling, extract with dilute hydrochloric acid and shake the acid solution with 3,000 parts of ether and ammonia in excess. The ortho-nitro-benzoyl quinin crystallizes almost immediately in fine needles, which are subjected to suction and washed with ether and water. To purify it, the base is recrystallized from 10 parts of alcohol; it forms tasteless needles melting at from 164.5° to 166.5° centigrade and very difficultly soluble in water, cold alcohol and ether, but readily soluble in hot alcohol and chloroform. For the purpose of preparing the ortho-amino-benzoyl quinin, 1 part of ortho-nitro-benzoyl quinin, 7 parts of 10 per cent. hydrochloric acid, 6 parts of diluted alcohol, and 4 parts of a 60 per cent. solution of stannous chlorid in 25 per cent. of hydrochloric acid, are heated for an hour to the boiling point. While still lukewarm, the mass is shaken with 14 parts of 20 per cent. soda-lye and 10 parts of ether until almost the whole is dissolved. The ethereal solution is separated, washed with water and dried. On standing, the ortho-amino-benzoyl quinin crystallizes in thick octahedrons which are tasteless and colorless and melt at from 135° to 137.5° centigrade. They are readily soluble in alcohol and chloroform, but are difficultly soluble in ether and petroleum-benzin. The acid hydrochlorid of this body which has the composition

is a yellow powder readily soluble in water, which powder is almost tasteless and has an anesthetic action.

*Example III.—Manufacture of the 5-amino-salicyl-quinin.*—324 parts of quinin (one molecular proportion) and 259 parts of 5-nitro-salol are heated in a vacuum for 4 hours at a temperature of from 140° to 145° centigrade, the phenol distilling off. The residue is heated with benzene and yellow small lamellar crystals containing benzene are obtained which, after being recrystallized from benzene, melt at 112° centigrade. On being boiled with 12 parts of 5 per cent. sulfuric acid, they dissolve and when the solution cools, the acid sulfate of 5-nitro-salicyl-quinin crystallizes out in yellow, tasteless leaflets which are very difficultly soluble in cold water and alcohol, but readily soluble in hot alcohol.

In order to prepare the 5-amino-salicyl quinin, 1 part of acid sulfate of 5-nitro-salicyl-quinin, 5 parts of 10 per cent. hydrochloric acid, 4 parts of diluted alcohol and 3 parts of 60 per cent. solution of stannous chlorid are heated for half an hour on the water bath. When the mass has cooled, it is shaken with 30 parts of 10 per cent. soda lye and 15 parts of ether; the alkaline solution is separated from the ethereal solution of the 5-amino-salicyl quinin, which latter is washed with water and shaken with 1.2 parts of 10 per cent. hydrochloric acid. On evaporating the hydrochlorid solution, the acid hydrochlorid of 5-amino-salicyl-quinin which has the composition

$C_{20}H_{23}N_2O_2.CO.C_6H_3.OH.NH_2.2HCl$ is obtained as a red-yellow powder readily soluble in water and alcohol and having scarcely any bitter taste.

The quinin esters of other aromatic amino acids can be prepared in an analogous manner.

I claim:

1. The herein described process of producing quinin esters of aromatic amino acids which comprises reducing the quinin esters of the corresponding aromatic nitro-acids.

2. The herein described process of producing quinin esters of aromatic amino acids which comprises reacting on quinin with an acidylizing reagent containing the nitro-acidyl radical of an aromatic nitro-carboxylic acid, and reducing the thus obtained nitro-acidyl-quinin.

3. The herein described process of producing amino-benzoyl-quinins which comprises reducing the corresponding nitro-benzoyl-quinins.

4. The herein described process of producing amino-benzoyl-quinins which comprises reacting on quinin with a nitro-benzoyl-chlorid, and reducing the nitro-benzoyl-quinin thus obtained.

5. The herein described process of producing para-amino-benzoyl-quinin which comprises reacting on quinin with para-nitro-benzoyl chlorid, and reducing the para-nitro-benzoyl-quinin thus obtained.

6. The herein described quinin esters of aromatic amino acids of the following general formula $C_{20}H_{23}N_2O_2.X$ where X represents the amino-acidyl radical of an aromatic amino acid, said products forming colorless and tasteless crystals, readily soluble in alcohol, and forming acid hydrochlorids readily soluble in water, substantially as described.

7. The herein described amino-benzoyl-quinins, forming colorless and tasteless crystals readily soluble in alcohol, and forming water soluble acid hydrochlorids having the following formula:

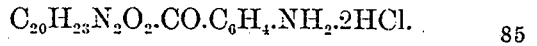

$C_{20}H_{23}N_2O_2.CO.C_6H_4.NH_2.2HCl$.

8. The herein described para-amino-benzoyl-quinin, forming colorless and tasteless crystals melting at 170° C., being readily soluble in alcohol, chloroform and hot benzene, and forming a water soluble acid hydrochlorid.

In testimony whereof I have signed my name to this specification in the presence of two subscribing witnesses.

HEINRICH THRON.

Witnesses:
 JEAN GRUND,
 CARL GRUND.